H. T. RASER.
WATER HEATER.
APPLICATION FILED JULY 3, 1909.
957,375.
Patented May 10, 1910.
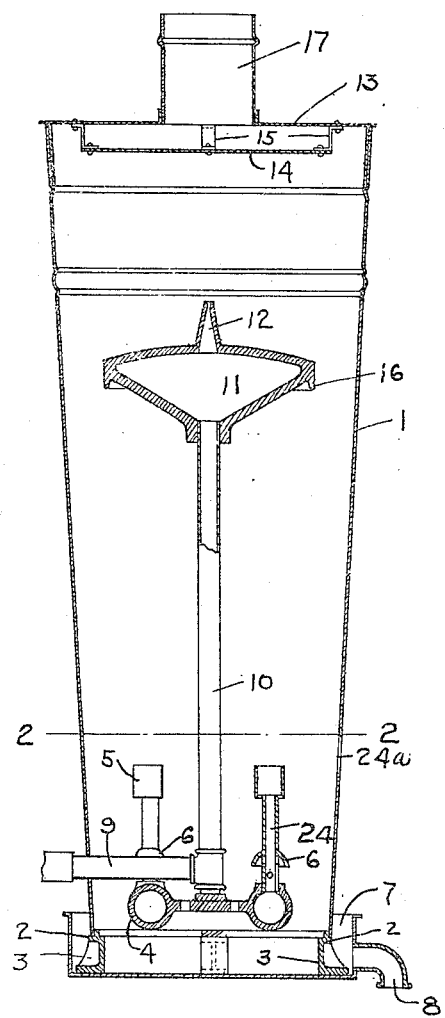
Witnesses
R. L. Gordon
M. M. Beigle
Inventor
Henry T. Raser
by H. T. Lind
Attorney

UNITED STATES PATENT OFFICE.

HENRY T. RASER, OF ASHTABULA, OHIO.

WATER-HEATER.

957,375.  Specification of Letters Patent.  Patented May 10, 1910.

Application filed July 3, 1909. Serial No. 505,944.

*To all whom it may concern:*

Be it known that I, HENRY T. RASER, a citizen of the United States, residing at Ashtabula, in the county of Ashtabula and State of Ohio, have invented new and useful Improvements in Water-Heaters, of which the following is a specification.

This invention relates to water heaters, and consists in certain improvements in the construction thereof, as will be fully described and pointed out in the claims.

More particularly, the invention relates to that type of water heaters as are used for domestic purposes, and which bring the heated gases and water into direct contact.

The invention is illustrated in the accompanying drawings as follows:

The drawing is a central vertical section through the heater, the general shape of the heater being round.

1 marks the drip case. In the preferred form this drip case is also the outer case of the heater. It is flaring toward the top for purposes hereinafter described. The drip case rests on the lugs 2 of the spider 3. The spider 3 supports the burner ring 4, from which projects the burners 5, provided with the ordinary mixers 6.

The spider 3 sets in a pan 7. Preferably, the spider is simply placed in the pan so that the pan may be rotated or moved relatively to the spider, and the case or spider removed. The water is carried from the pan by the nozzle 8. The water is delivered to the heater through the pipe 9. This is preferably near the bottom of the heater, and the pipe 10 extends upwardly from the pipe 9 to a hollow deflector plate 11. A jet nozzle 12 is connected with the deflector plate 11.

The cover 13 carries the water deflector plate 14. This is suspended from the cover by means of the straps 15.

The hollow deflector plate 11 has the lips 16 which assure the drip from the plate 11 dropping from the edge, and this edge is out far enough to carry the drip clear of the burners 5.

The heated gases and flame rise from the burners, striking the gas deflector plate 11, and are thrown against the drip case 1, and into direct contact with the water, the gases passing on upwardly and through the space between the cover 13 and the plate 14 to the pipe 17.

The water jet strikes the water deflector plate 14, and is deflected to the drip case 1, passing through the heated gases, and absorbing the greater portion of the heat from the gases. By making the drip case flaring, the moisture or drip on the case remains on the surface even though agitated by the gas currents. This is very desirable in a case of this kind. The case is also large enough to carry the drip outside of the burners. The case also permits of the deflector plate 11 carrying any drip from it outside of the burners without reducing the space between it and the drip case to such an extent as to retard the free flow of the gases. The pan 7 is preferably of such size as to extend outside of the drip case so that any leakage is caught by the pan as well as the drip from the drip case on the inside.

By placing the drip case on the spider, it is lifted a sufficient distance above the bottom of the pan to permit the passage of air under the bottom edge of the case to supply air for the combustion. A hollow deflector carries sufficient water to keep the deflector comparatively cool, thus preventing the burning off of the edges of the deflector. At the same time whatever heat is absorbed by the water in this cooling of the deflector, is of course added to the efficiency of the device in that the water as it is delivered at the jet is of higher temperature.

What I claim as new is:

1. In a water heater the combination of a burner; a drip case flaring toward the top, and arranged to carry the drip outside the burner; a gas deflector above the burner; and a spray delivering device above the deflector adapted to spray water in the path of the gases, the deflector case and burner being arranged relatively to each other to direct the water and heated gases into contact, and the case to carry the water in contact with the heated gases, to the level of the burner.

2. In a water heater, the combination of a burner; a drip case flaring toward the top and arranged to carry the drip outside of the burner, said drip case forming the outer case of the heater; and a spray delivering device for delivering water to the walls of the case above the burner.

3. In a water heater, the combination of a burner; a drip case flaring toward the top and arranged to carry the drip outside of the burner; a spray delivering device for delivering water to the walls of the case; and a gas deflector above the burner and below the spray delivering device, said deflector being larger than the burner and having its edge arranged to carry the drip outside the burner.

4. In a water heater the combination of a drip case; a burner arranged within the case; a jet device for delivering water; a water supply pipe leading to the jet device and a deflector below the jet and above the burner, said deflector having a water space in connection with the delivery pipe for cooling the deflector, said water spaces being of greater diameter than the water supply pipe.

5. In a water heater, the combination of a pan; a drip case open at the bottom and mounted in the pan, the pan being of larger diameter than the case to catch the drip from both the outer and inner walls of the case; a burner in the case; and means for delivering spray to the inner walls of the case.

6. In a water heater, the combination of a pan; a drip case open at the bottom and mounted in the pan, with its bottom above the bottom of the pan, the pan being of greater diameter than the bottom of the drip case, leaving openings for supplying air for supporting combustion; a burner in the case; and means for delivering water in the form of spray to the walls of the case.

7. In a water heater, the combination of a pan; a spider arranged in the pan; a burner mounted on the spider; a drip case open at the bottom and surrounding the burner, and mounted on the spider with its bottom above the bottom of the pan leaving openings for supplying air to support combustion; and means for delivering water in the form of spray to the walls of the case.

8. In a water heater, the combination of a pan; a drip case mounted in the pan, the pan being free to turn relatively to the case, and having a discharge nozzle therefrom; a burner in the case; and means for delivering water in the form of spray to the walls of the case.

9. In a water heater, the combination of a pan; a drip case mounted in the pan, the drip case being of less diameter than the pan, and the pan arranged to receive the drip from the inner walls of the case, and any drip from the outer walls of the case, said pan being free to turn relatively to the case; a discharge nozzle on the pan; and a burner within the case.

In witness whereof, I have hereunto set my hand in the presence of two subscribing witnesses.

HENRY T. RASER.

Witnesses:
H. C. LORD,
M. M. BEIGLE.